United States Patent
Sapp et al.

(10) Patent No.: US 12,435,749 B2
(45) Date of Patent: Oct. 7, 2025

(54) ADJUSTABLE NUT FOR FAUCET INSTALLATION

(71) Applicant: COMPASS MANUFACTURING INTERNATIONAL, LLC, Louisville, KY (US)

(72) Inventors: Ken Sapp, Lakeville, MN (US); DeChang Li, Maspeth, NY (US)

(73) Assignee: COMPASS MANUFACTURING INTERNATIONAL, LLC, Louisville, KY (US)

( * ) Notice: Subject to any disclaimer, the term of this patent is extended or adjusted under 35 U.S.C. 154(b) by 138 days.

(21) Appl. No.: 17/542,346

(22) Filed: Dec. 3, 2021

(65) Prior Publication Data

US 2022/0228622 A1 Jul. 21, 2022

Related U.S. Application Data

(60) Provisional application No. 63/121,219, filed on Dec. 3, 2020.

(51) Int. Cl.
*F16B 37/08* (2006.01)
*F16B 39/282* (2006.01)

(52) U.S. Cl.
CPC .................. *F16B 39/282* (2013.01)

(58) Field of Classification Search
CPC .......................... F16B 37/0864; F16B 37/0857
USPC ....................................................... 411/433
See application file for complete search history.

(56) References Cited

U.S. PATENT DOCUMENTS

| | | | | |
|---|---|---|---|---|
| 4,737,059 A | * | 4/1988 | Batten | F16B 37/0864 411/433 |
| 5,902,085 A | * | 5/1999 | Yuta | F16B 37/0857 411/908 |
| 6,351,260 B1 | | 2/2002 | Graham et al. | |
| 6,729,822 B2 | * | 5/2004 | Sbongk | F16B 39/026 411/270 |
| 6,974,291 B2 | * | 12/2005 | Li | F16B 37/0864 411/429 |
| 7,179,038 B2 | * | 2/2007 | Reindl | F16B 37/0864 411/188 |

(Continued)

*Primary Examiner* — Flemming Saether
(74) *Attorney, Agent, or Firm* — Carrithers Law Office, PLLC; David Carrithers

(57) ABSTRACT

A faucet mounting structure includes a threaded pipe and a threaded lock nut. The quick tighten and release adjustable lock nut includes a separate upper main body and a lower main which snap fit together. The upper main body includes downward extending lugs with inward facing threads which are urged against the outward facing threads of a faucet pipe to hold the pipe and thus, hold the faucet in a fixed position on a counter top. The downward extending lugs are captured in canted arcuate recesses in the lower main body. The canted arcuate wedge shaped side wall ramps biases the threaded lugs outward decreasing the diameter of the inner bore and pressing against the pipe threads as the lower main body is rotated clockwise with respect to the upper main body enabling the lock nut to slide upward over the threaded shank of the faucet until abutting the top portion of the threaded faucet pipe whereby rotating the lock nut causes cooperative engagement between the threaded lugs of the lock nut and the threaded faucet pipe tightening the lock nut threads around the threaded pipe.

6 Claims, 22 Drawing Sheets

(56) References Cited

U.S. PATENT DOCUMENTS

| | | | |
|---|---|---|---|
| 7,338,242 B2 | 3/2008 | Ellis et al. | |
| 8,231,318 B2 * | 7/2012 | Pitsch | F16B 37/0864 411/270 |
| 8,348,578 B2 * | 1/2013 | Busch | F16B 37/0864 411/433 |
| 9,222,245 B2 * | 12/2015 | Ye | E03C 1/04 |
| 9,637,893 B2 * | 5/2017 | Lin | E03C 1/0401 |
| 10,563,383 B2 | 2/2020 | Lu et al. | |
| 2006/0101576 A1 | 5/2006 | Rhodes | |
| 2009/0297294 A1 * | 12/2009 | Li | F16B 37/0864 411/433 |

* cited by examiner

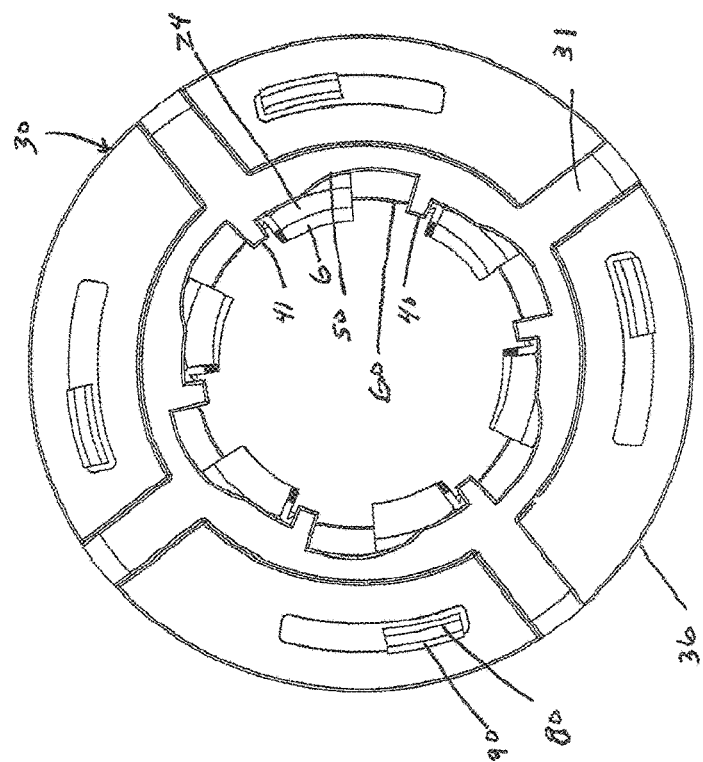
FIG. 13(b) Lock
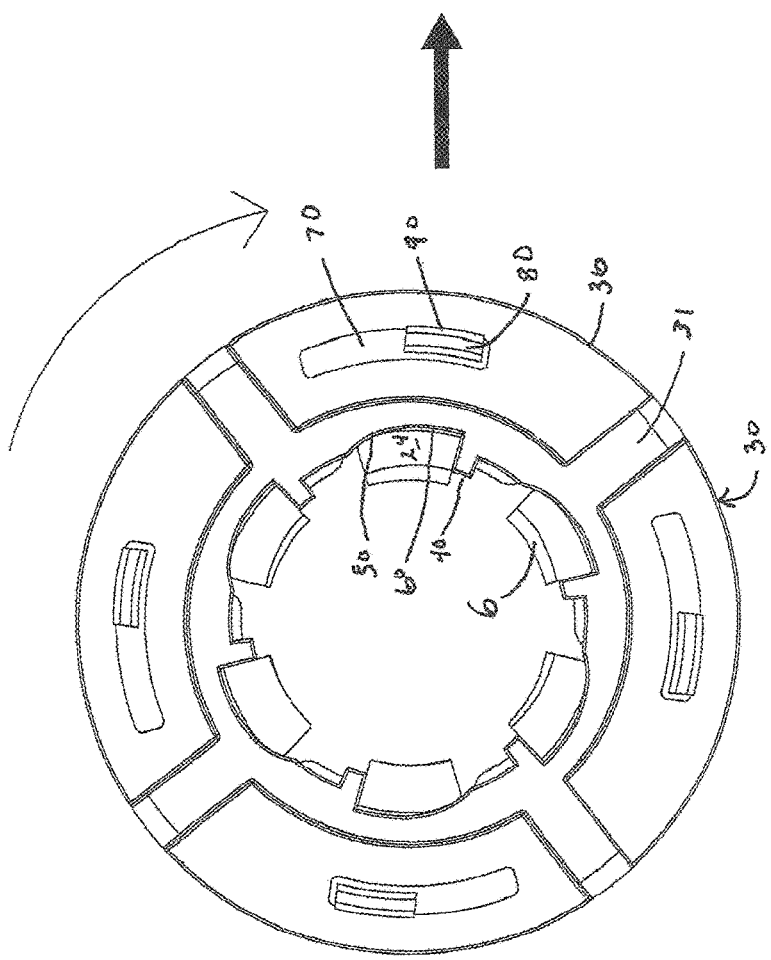
FIG. 13(a) Open

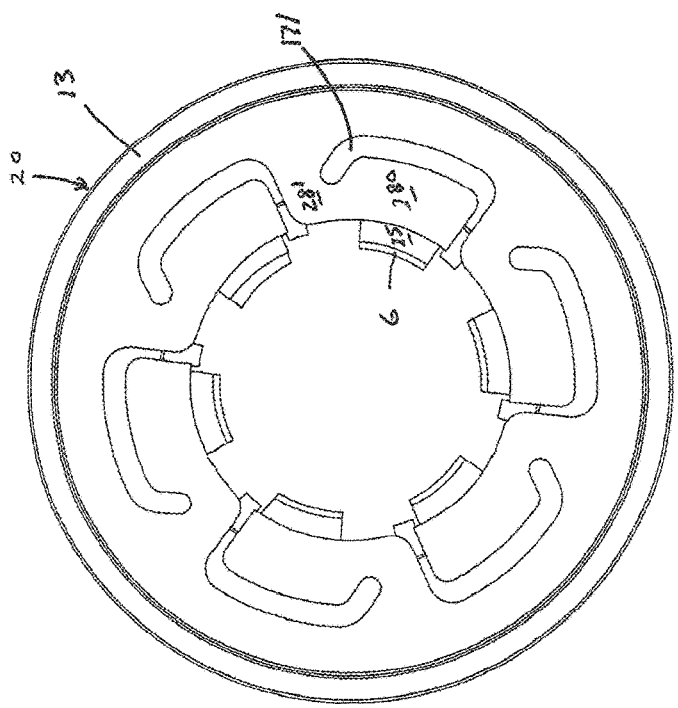
FIG. 14(b) Lock
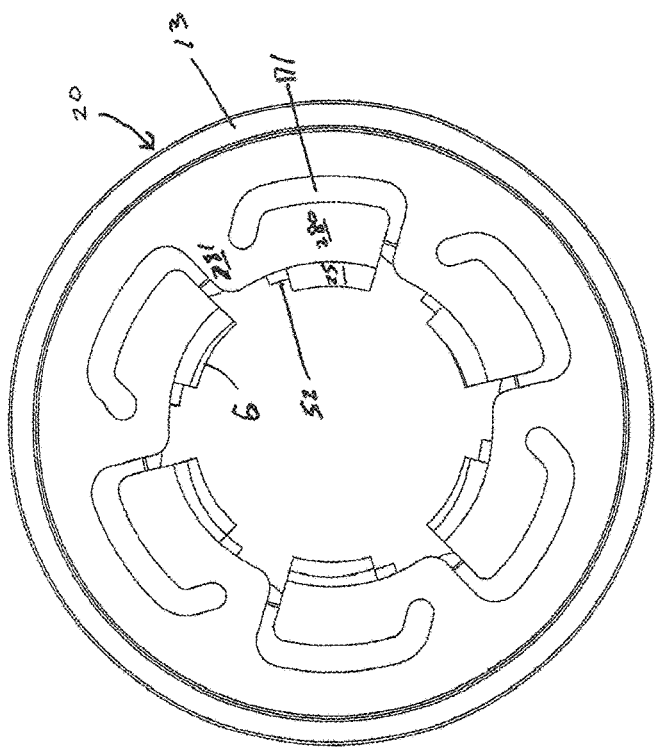
FIG. 14(a) Open

Lock

Open

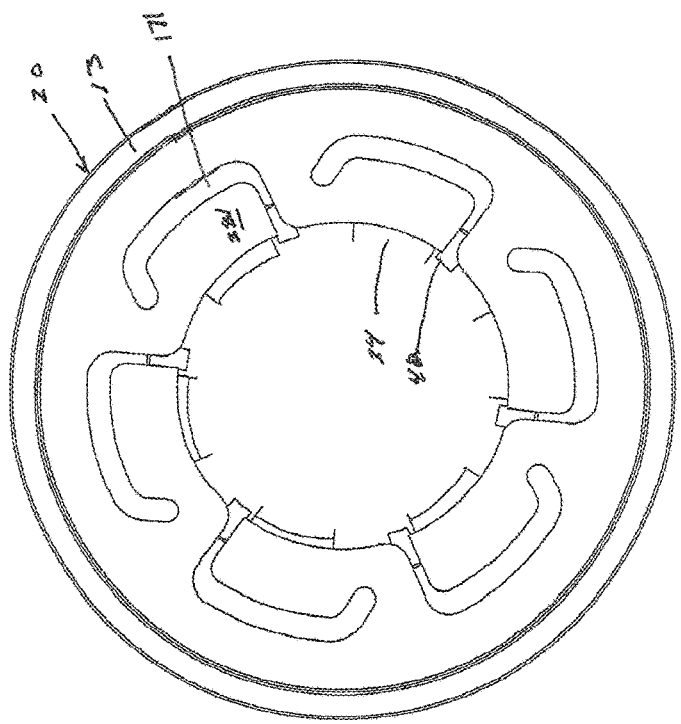
FIG. 16(b) Lock
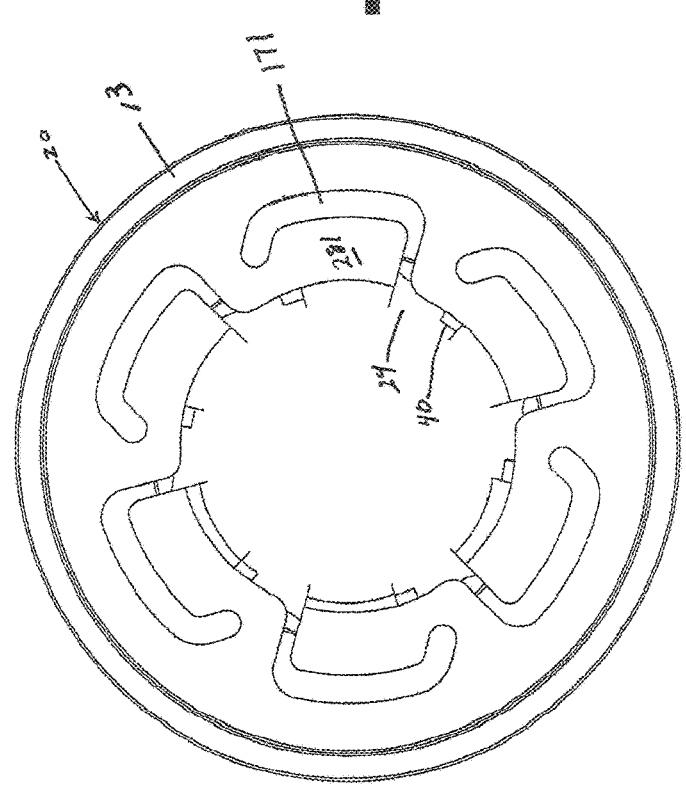
FIG. 16(a) Open

ADJUSTABLE NUT FOR FAUCET INSTALLATION

CROSS REFERENCES TO RELATED APPLICATIONS

This application claims priority from U.S. Provisional application Ser. No. 63/121,219 filed on Dec. 3, 2020 and is incorporated herein in its entirety.

TECHNICAL FIELD

The present invention relates to the field of threaded fasteners used to fix a faucet in place in a counter top, especially a threaded fastener which can be installed by hand very quickly and using no tools.

BACKGROUND OF THE INVENTION

Commonly used faucets generally include two lengthy pipes with external threads, one for hot water and the other for cold water. The two pipes are inserted in pre-cut holes in the counter top. Then a washer and a nut are threaded onto the pipes and tightened to fix the faucet rigidly in place. These nuts are either metal or plastic. When plastic nuts are used, the nuts typically have wings instead of hexagonal walls like common metal nuts. The wings allow easy hand tightening of the nuts. As stated above, the pipes are generally lengthy thus causing the installation to require more time than would be preferable. Further, because the pipes are under the counter top, behind the sink, at an uncomfortable distance from the installer and in poor or no lighting, starting the nut correctly on the pipe and then threading the nut on up the pipe is difficult and time consuming.

Push and turn nuts of different designs are known in the art. For instance, U.S. Pat. No. 10,563,383 by Lu et al teaches a faucet mounting structure which includes a pipe connector and a fixing assembly in cooperation with the pipe connector. The fixing assembly includes an upper main body and a lower main body. A first inclined surface of the upper main body and a second inclined surface of the lower main body are pressed against each other or separated from each other, so that a press ring of the lower main body is compressed or returned for engaging with or disengaging from an external thread of the pipe connector to realize the quick assembly and disassembly of the pipe connector and the fixing assembly, and the quick assembly and disassembly of the faucet body is realized.

U.S. Pat. No. 7,338,242 includes a fastener assembly with a washer element and a nut element, wherein the latter is split and has a screw thread that threadably engages a bolt, such as for construction and other uses. U.S. Pat. No. 6,351,260 discusses a push and turn fastener for use on a bolt. Insert segments are placed within a central bore, and each segment has an inwardly facing threaded portion and outward projection. The inner segment has a front beveled edge to slide into the bore in a corresponding portion. The outwardly extending portion cooperates with a ledge to limit movement of the insert. An end cap retains the segments in the housing. The inside segments are displaced in the housing to accommodate longitudinal movement of a bolt through the housing for quick installation.

U.S. Patent Publication No. 2006/0101576 A1 of Rhodes includes a mounting nut for a water connection fitting that is hinged for sliding over the fitting and up against the bottom-mounting surface of a sink to secure a faucet to a sink deck. Pushing the nut against the deck causes the sides of the nut to compress against the threaded water pipe.

There is a need for a faucet installation lock nut allows the installer to push the nut as far along the threads as possible with as little spin as possible, tightening only at the end of the threaded bolt or threaded tailpiece of a faucet. Sufficient torque must be transmitted to the nut when threading upon proper location on the bolt or threaded tailpiece. The lock nut needs to be easy to make and install within small and awkward locations where faucet assemblies and other plumbing fixtures are installed or in other areas where nut and bolt installation is physically challenging to the user.

SUMMARY OF THE INVENTION

A faucet mounting structure includes a threaded pipe and a threaded lock nut. The quick release adjustable lock nut includes a separate upper main body and a lower main which snap fit together. The upper main body includes downward extending lugs with inward facing threads which are urged against the outward facing threads of a faucet pipe to hold the pipe and thus, hold the faucet in a fixed position on a counter top. The downward extending lugs are captured in canted arcuate recesses in the lower main body. The canted arcuate wedge shaped side wall ramps biases the threaded lugs outward decreasing the diameter of the inner bore and pressing against the pipe threads as the lower main body is rotated clockwise with respect to the upper main body enabling the lock nut to slide upward over the threaded shank of the faucet until abutting the top portion of the threaded faucet pipe whereby rotating the lock nut causes cooperative engagement between the threaded lugs of the lock nut and the threaded faucet pipe tightening the lock nut threads around the threaded pipe.

The adjustable nut assembly includes a lower main body comprising an annular ring with a rim extending around an inner edge of the annular ring including wings for gripping protruding from the outer wall of the rim and the rim including an inner circumferential surface having a plurality of spaced apart inwardly wedge shaped arcuate ramps abutting stop means extending along the inner wall of the rim. The nut assembly includes an upper main body having a lower rim portion. The upper main body defines a flat ring or washer including a plurality of downwardly extending projections or lugs, each one having an outer surface and an inner threaded surface whereby a portion of the inner surfaces of the projections is configured to engage a nut-receiving threaded shaft and the outer portion of the projections is configured to engage the inner circumferential surface and inner wall of the lower main body rim such that upon a pushing rotating action of a user the inwardly extending flange on the rim presses upwardly on the upper outwardly extending portion of the projecting lugs so that the threaded portion of the inner surfaces of the projections configured to receive a nut-receiving surface moves outwardly and upon removal of the pushing action, portion of the inner surfaces of the projections configured to receive a nut-receiving surface moves inwardly.

An adjustable locknut assembly includes an upper main body and a lower main body. Thee upper main body has a circular top surface including an upward extending peripheral ring. The upper main body includes six downward extending spaced apart threaded lugs with interior threaded portions facing radially inward for cooperatively engaging a threaded pipe. The upper main body includes a plurality of downward extending spaced apart smooth lugs, each smooth lug having an outward extending distal ridge extending around an outer edge. The spaced apart threaded lugs extend from a plurality of corresponding ovoid shaped base members which integrally connect to the upper main body by a connecting portion at one end of the ovoid shaped member biasing the threaded lugs inwardly for cooperatively engaging a threaded pipe. The lower main body includes an annular flat ring with an open center and a cylindrical rim extending downward from a central portion of the flat ring. The cylindrical rim has spaced apart inward facing arcuate shaped ramps each one formed from a wedge shaped step, each arcuate shaped ramp being canted terminating at a distal end by an inward facing lug. The annular flat ring having a plurality of spaced apart arcuate slots formed therein. Each spaced apart smooth lug reaches downward through the arcuate slot whereby the outward extending distal ridge at the outer edge of the spaced apart smooth lug cooperatively engages an outer lower edge of the arcuate slot to hold the upper main body securely together with the lower main body. The annular flat ring including means for manually rotating said quick lock nut which biases the threaded lugs inward tight around the threaded pipe.

It is an object of this invention to provide a quick lock nut which includes an upper main body with threaded portions extending downward into a lower main body. The lower main body includes opposing lugs extending from the rim for hand tightening the nut. As the nut is tightened, the inner walls compress the threaded portions tightly against the pipe threads to fixedly attach the faucet to the counter top.

It is an object of this invention to provide a quick lock nut which includes an upper main body with threaded portions extending downward into arcuate shaped recesses contained in a lower main body. The lower main body includes at least two wings for hand tightening the nut. As the nut is tightened, the inner walls of the arcuate shaped recesses compress the threaded portions tightly against the pipe threads to fixedly attach the faucet to the counter top.

It is an object of this invention to provide a quick lock nut which uses the relative rotary motion of two main bodies with respect to one another to provide compression of threaded members against a faucet pipe.

The adjustable lock nut comprises a polymer such as nylon, graphite or aramid type fiber of other polymer or polymer blend providing a substantially rigid lock not assembly with a sufficient pliablity or flexibility for the lugs members to flex and slide over the ramp members for tighten the adjustable nut.

Other objects, features, and advantages of the invention will be apparent with the following detailed description taken in conjunction with the accompanying drawings showing a preferred embodiment of the invention.

BRIEF DESCRIPTION OF THE DRAWINGS

A better understanding of the present invention will be had upon reference to the following description in conjunction with the accompanying drawings in which like numerals refer to like parts throughout the views wherein:

FIG. 13(a) is a bottom view of the lock nut assembly in the open expanded position;

FIG. 13(b) is a bottom view of the lock nut assembly in the closed contracted position;

FIG. 14(a) is a top view of the lock nut assembly in the open expanded position.

FIG. 14(b) is a top view of the lock nut assembly in the closed contracted position.

FIG. 16(a) is a top view of the lock nut assembly in the expanded open position;

FIG. 16(b) is a top view of the lock nut assembly showing the downward extending lugs around the outer periphery of the upper body in the contracted closed position.

DESCRIPTION OF THE PREFERRED EMBODIMENTS

Figure 1:
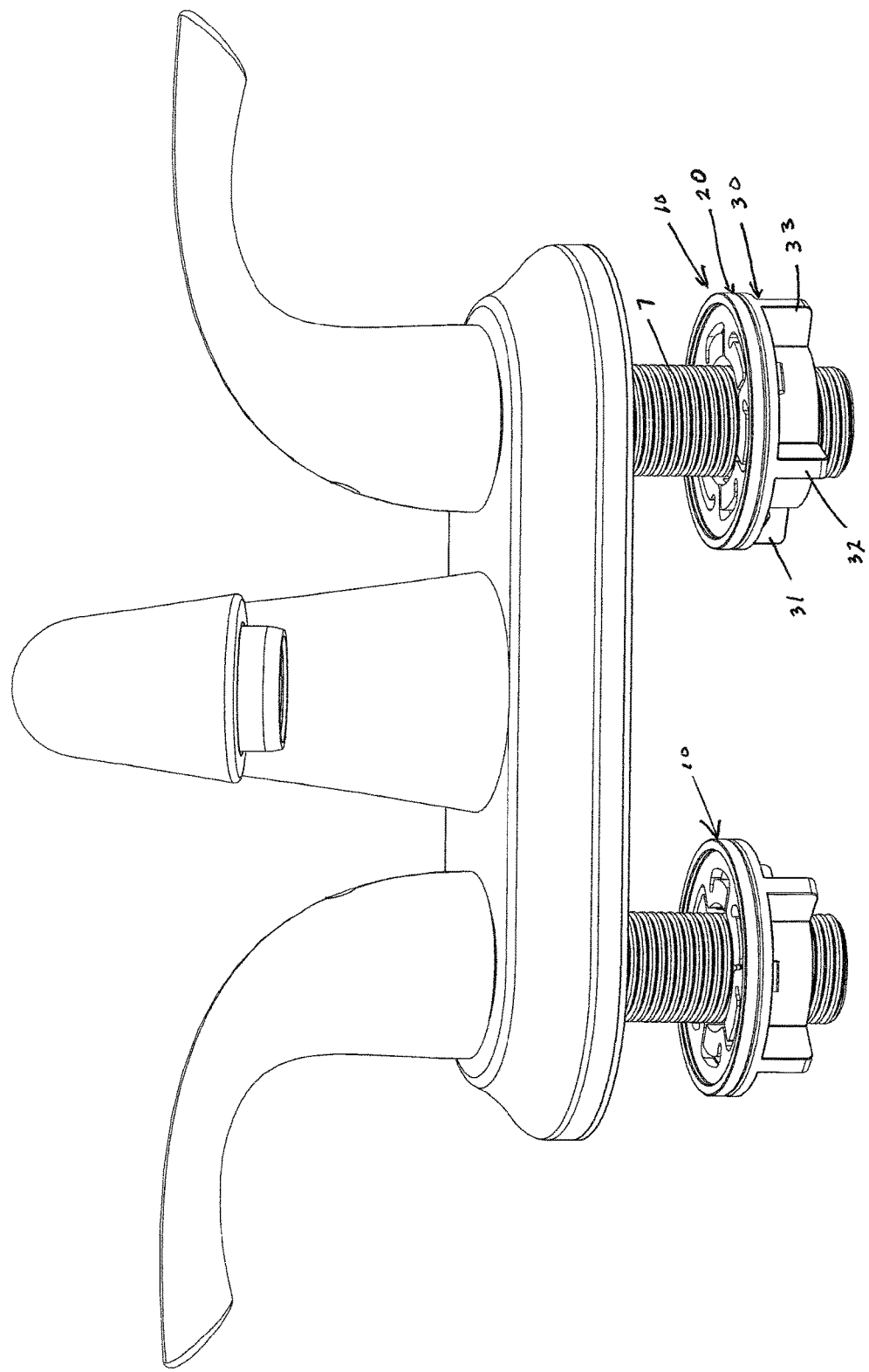
FIG. 1 is a perspective view showing a conventional faucet and the adjustable lock nut assembly.
Figure 2:
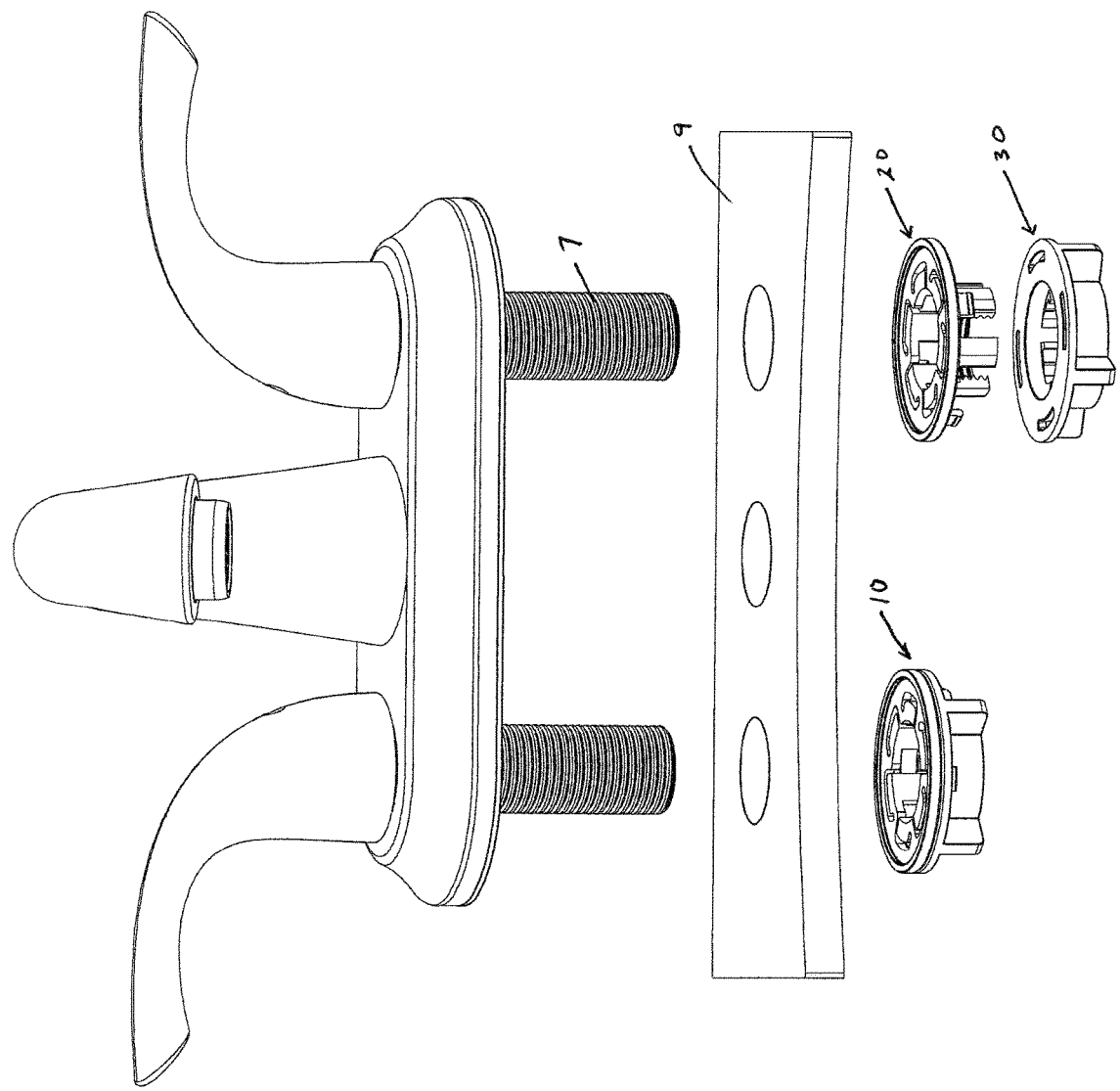
FIG. 2 is an exploded view showing a faucet having a threaded shank disposed through a mounting surface and the lock nut assembly with the upper body and lower body showing the split nut arrangement of the present invention.
Figure 3:
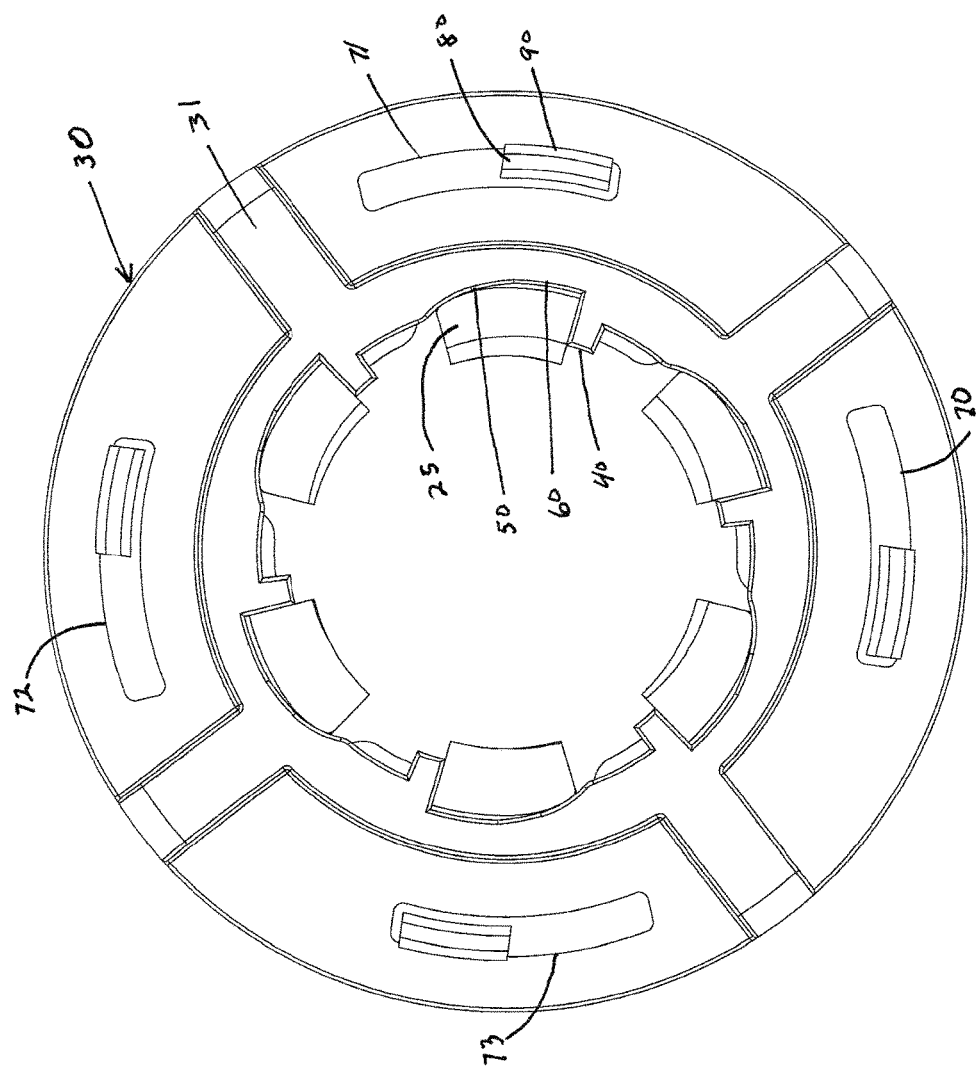
FIG. 3 is a top view showing the upper body cooperatively engaging the lower body of the assembled lock nut in the expanded position.
Figure 4:
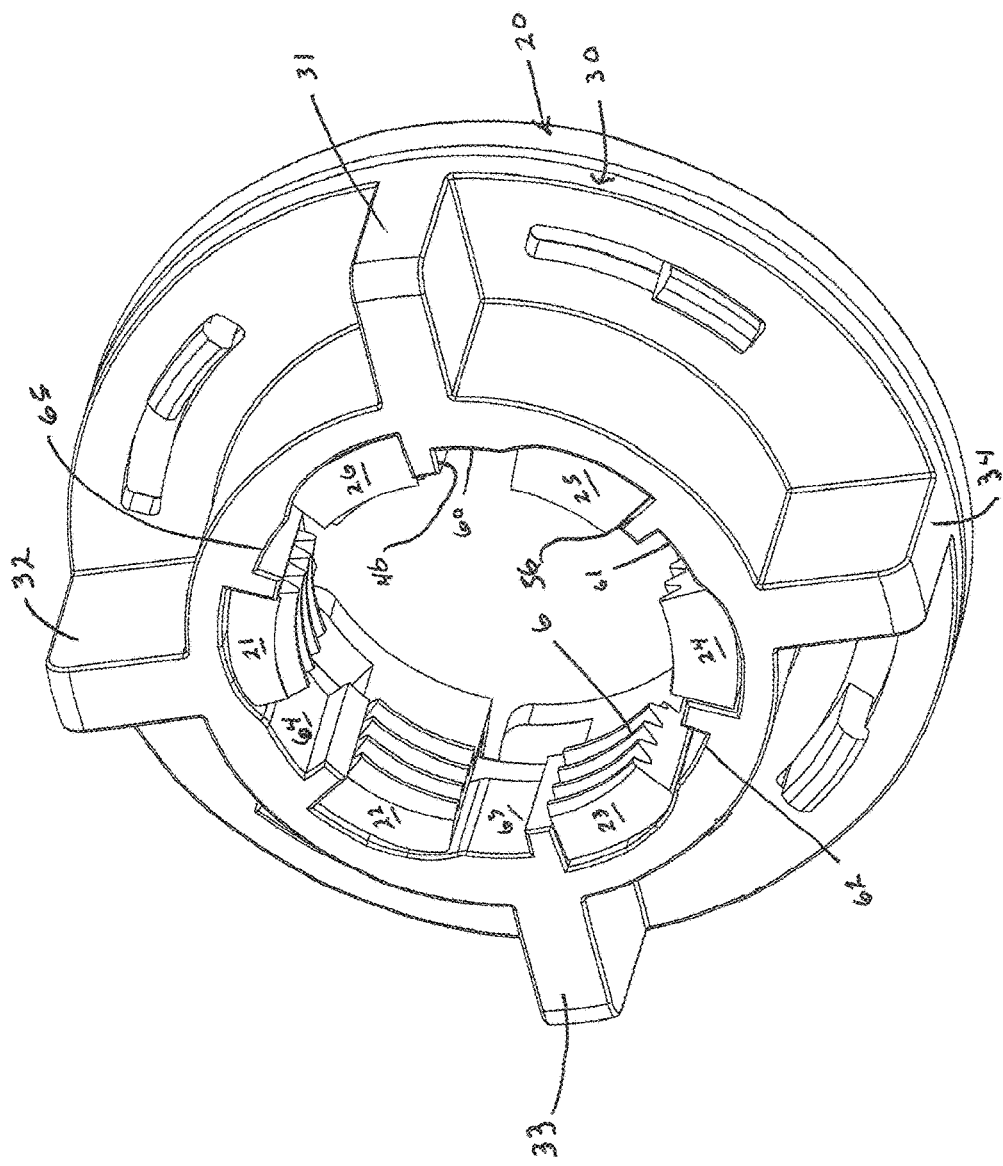
FIG. 4 is a perspective view showing the lower body cooperatively engaging the upper body of the assembled lock nut in the expanded position.
Figure 5:
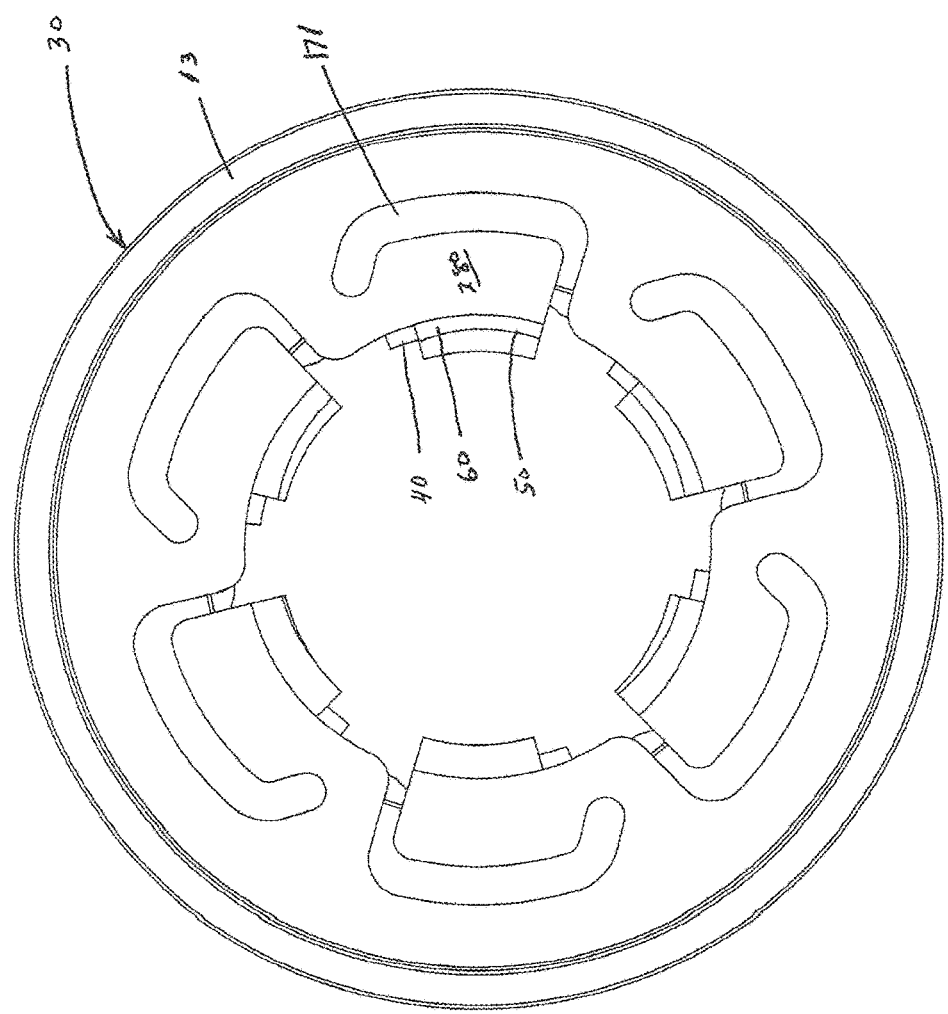
FIG. 5 is a top view of the upper body cooperatively engaging the lower body of the assembled lock nut of FIG. 3.
Figure 6:
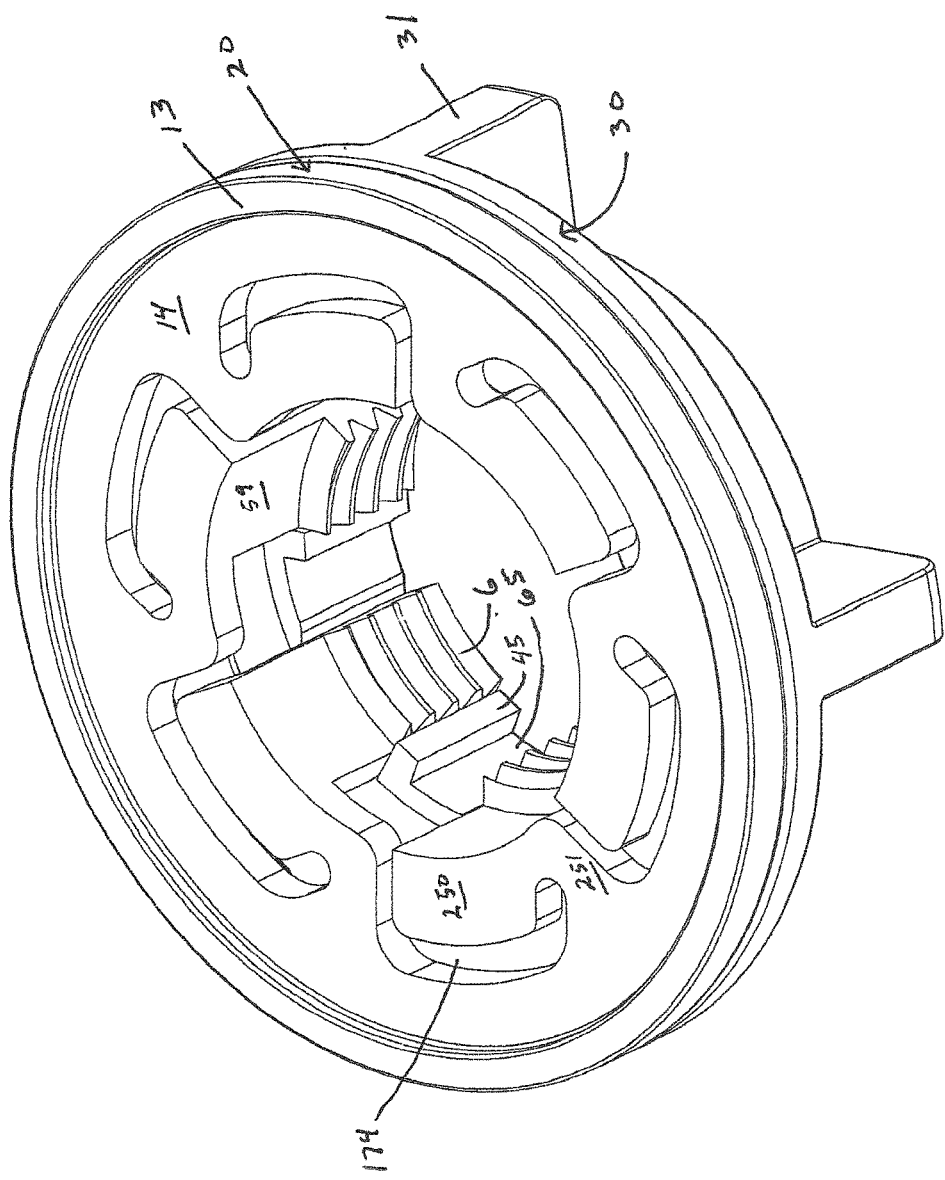
FIG. 6 is a top perspective view showing the upper body cooperartively engaging the lower body of the assembled lock nut in the expanded position.
Figure 7:
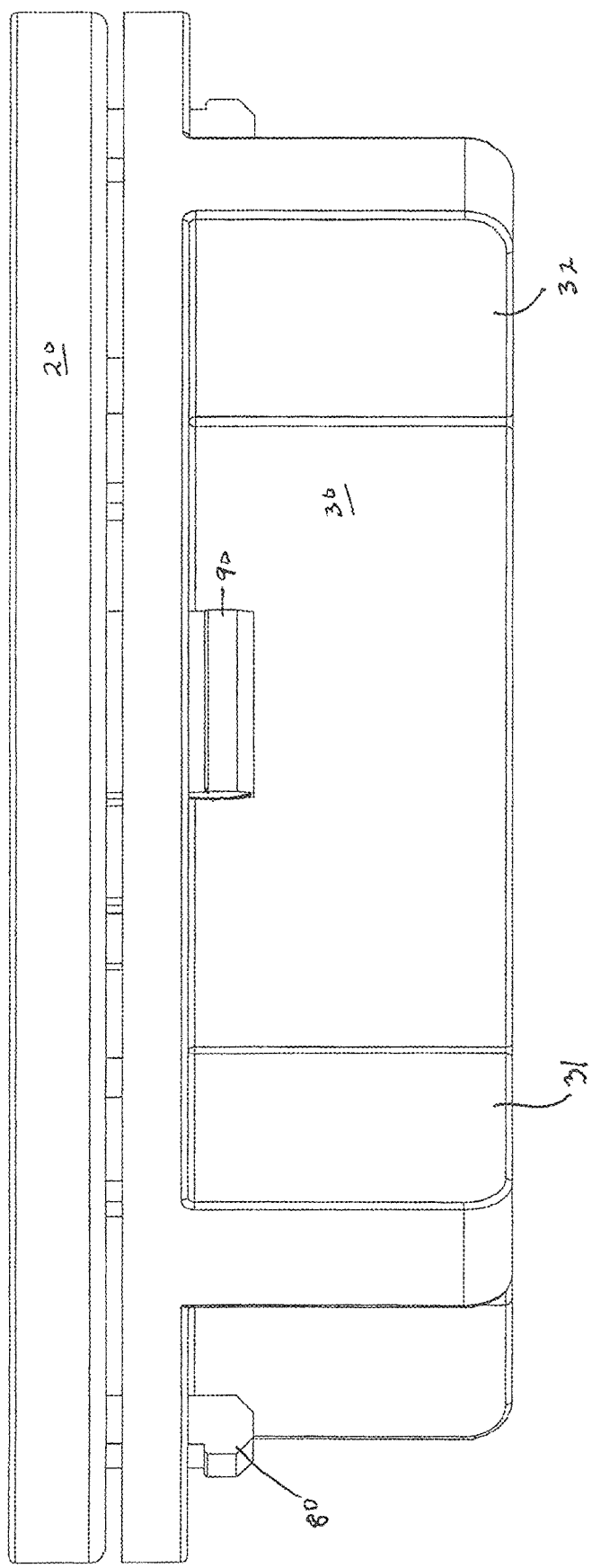
FIG. 7 is a side view of the assembled lock nut showing the upper body engaging the lower body.
Figure 8:
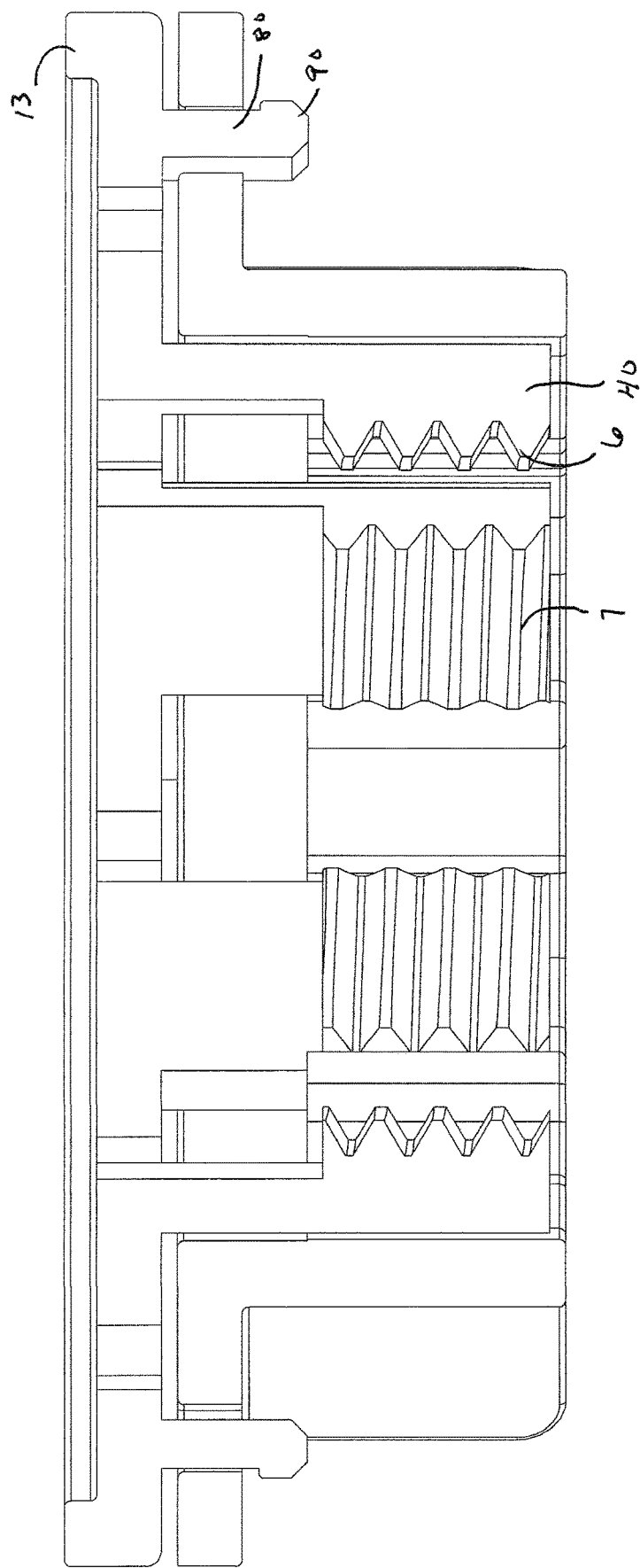
FIG. 8 is a sectional view of FIG. 7.
Figure 9:
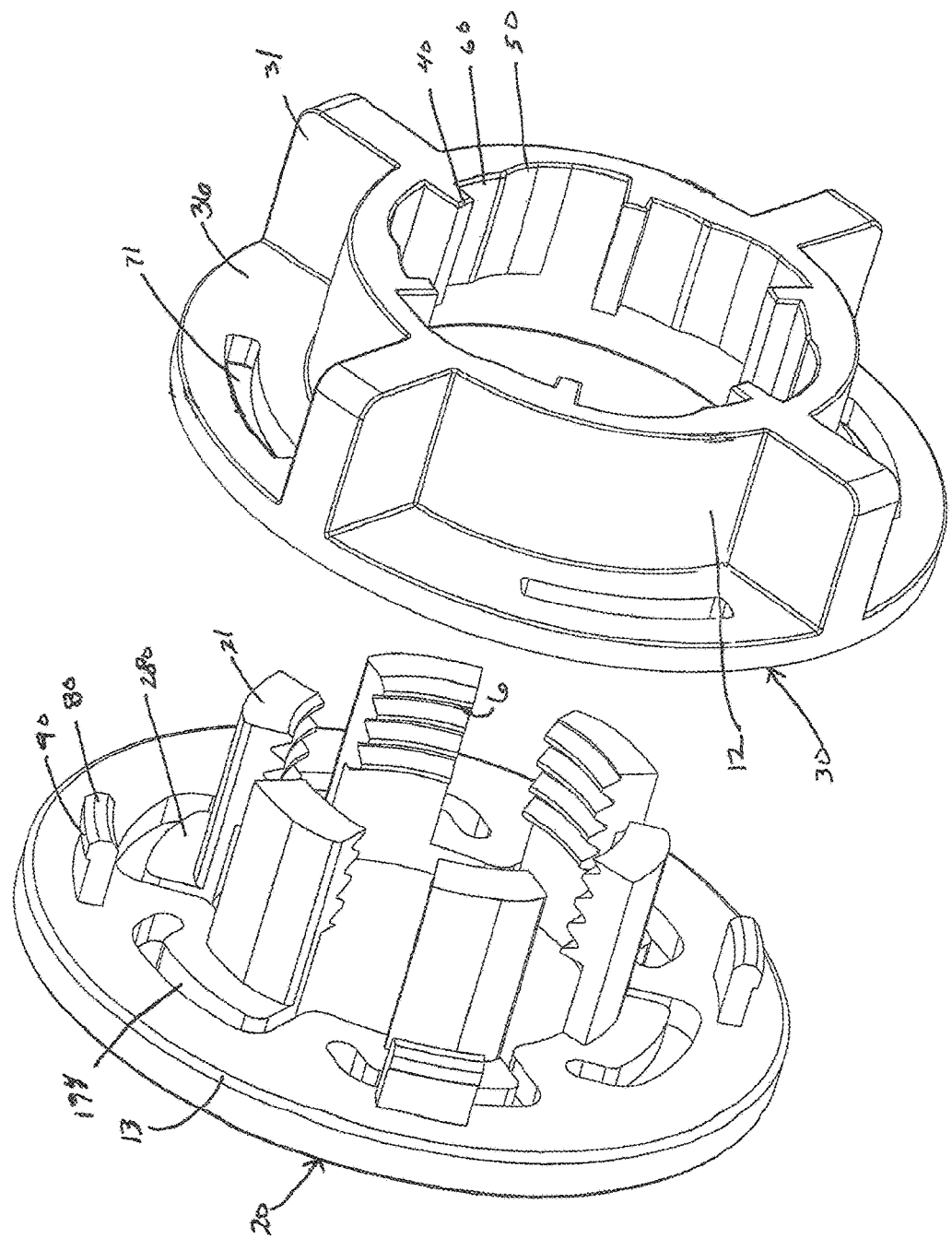
FIG. 9 is a perspective view showing the top of the lower body aligned with the bottom of the upper body.
Figure 10:
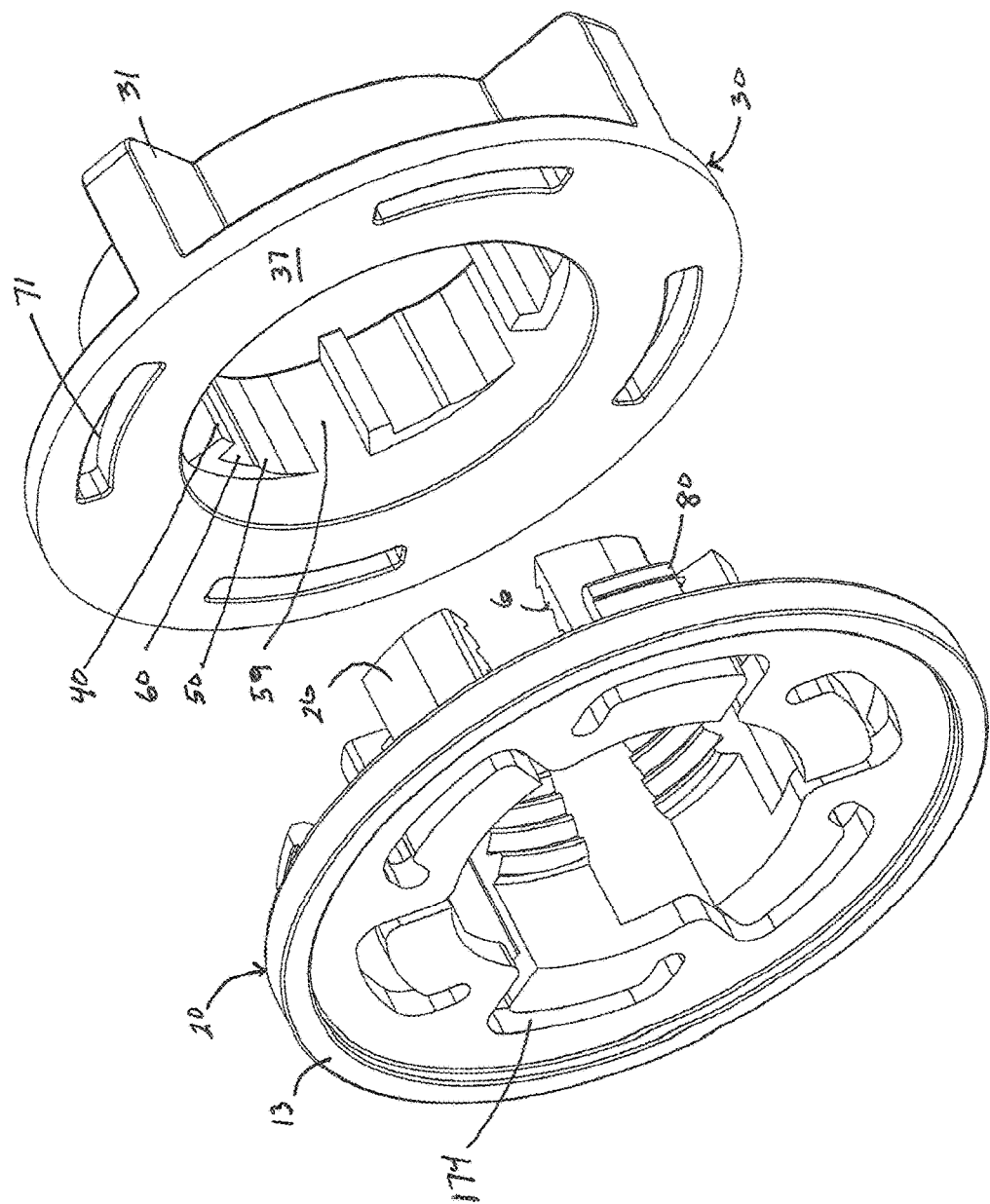
FIG. 10 is a perspective view of the bottom of the upper body aligned with the top of the upper body.
Figure 11:
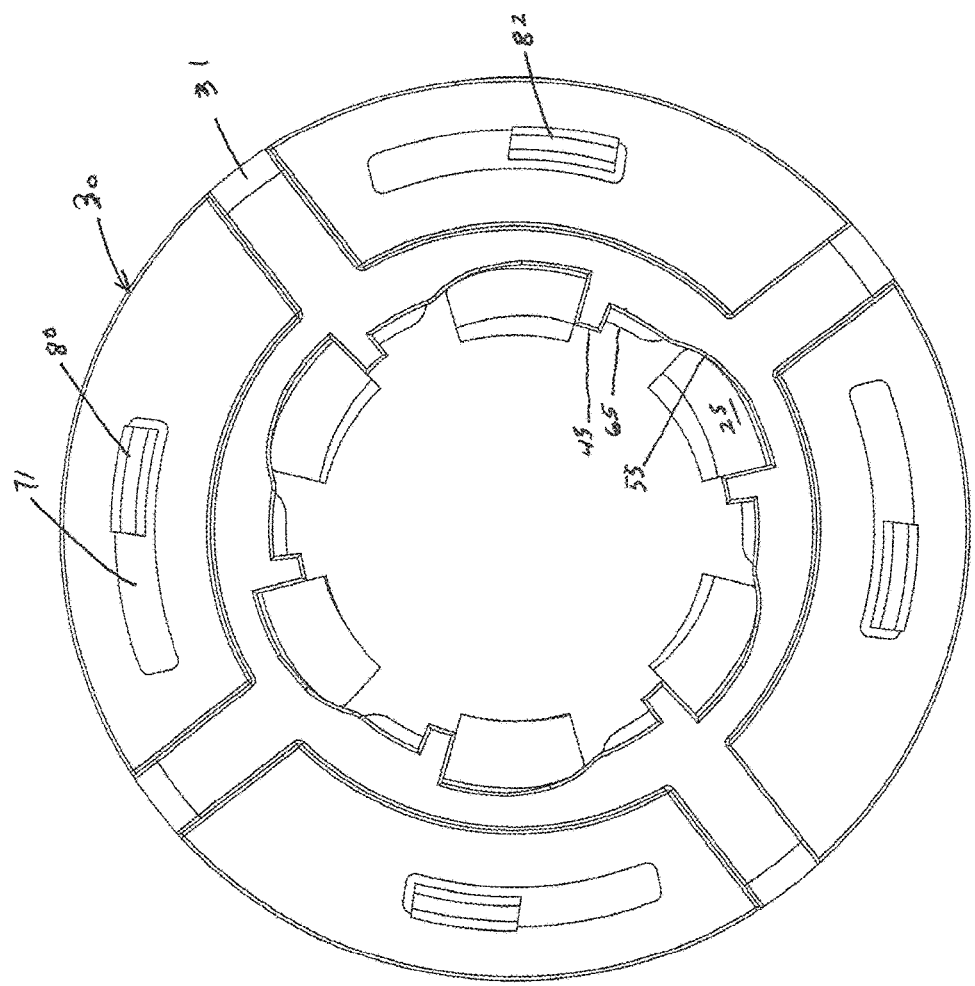
FIG. 11 is a top view of the lock nut assembly showing the upper body cooperatively engaging the lower body in an expanded position.
Figure 12:
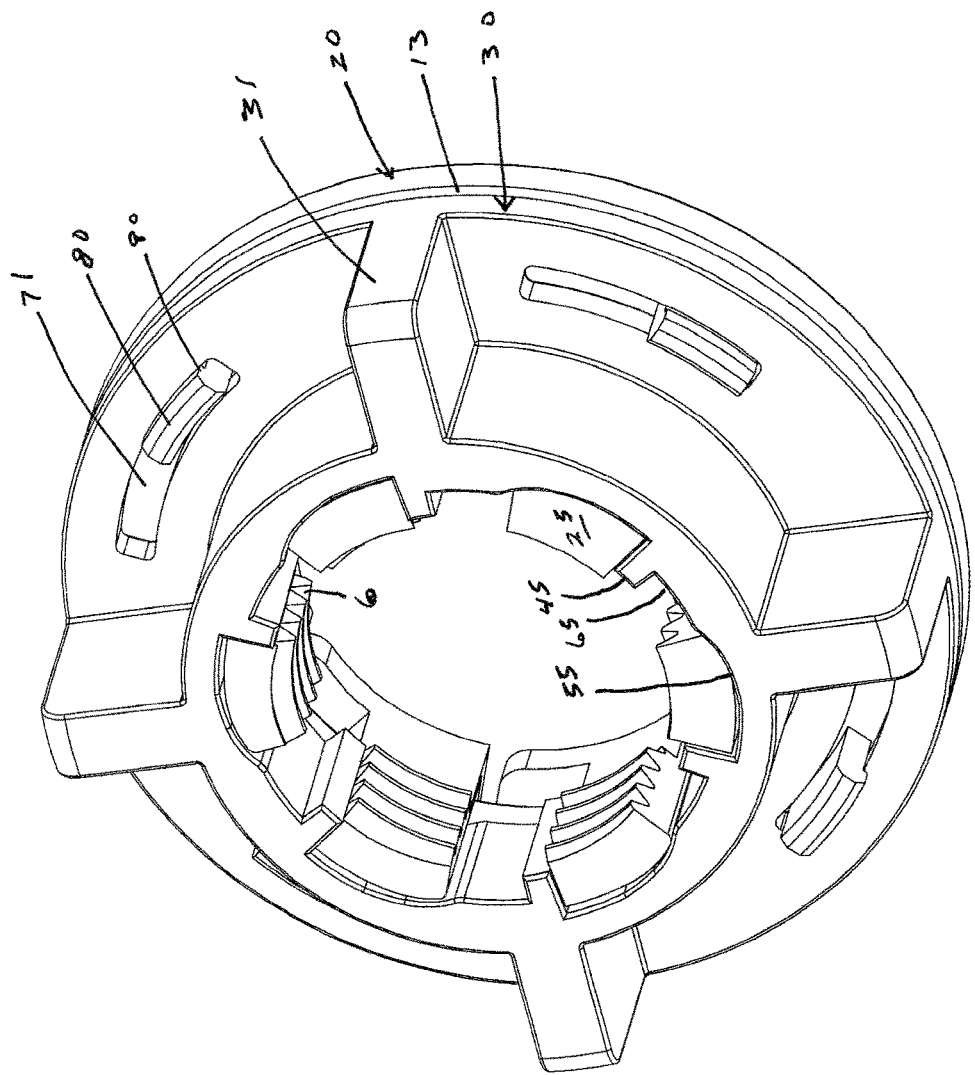
FIG. 12 is a top view of the lock nut assembly showing the lower body cooperatively engaging the upper body in an expanded position.

In accordance with the present invention, there is provided a quick lock nut to be used as a fixing assembly to fixedly attach a faucet to a counter top.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list Example embodiments will now be described more fully with reference to the accompanying drawings.

The quick lock nut assembly or "nut" 10 of the present invention illustrated in figures and comprises a two piece snap together assembly formed of plastic by molding having an upper main body member 20 and corresponding sized and shaped mating lower main body member 30.

The upper main body 20, shown in FIGS. 1-22, has a circular flat top surface 14 including an upward extending integral circumferential outer ridge forming a ring 13, extending above the circular flat top surface 14 of the upper body 20 a spacer means coming into contact with the bottom surface of the counter top 9 as the nut is tightened, to provide friction which helps to counteract further rotary motion of the upper main body 20, as the user rotates the nut 10 contracting the teeth 6 around a threaded pipe for a faucet or other appliance. The upper main body 20 includes at least three, but preferably six downward extending spaced apart threaded lugs 21-26 with interior arcuate threaded face portions facing radially inward. The arcuate threaded face portions define a plurality of threaded curved or concave heads arranged in a circle whose diameter is adjustable to slightly smaller or slightly larger than the diameter of a the threads 7 of the threaded faucet pipe. The upper main body also includes at least two but preferably four downward extending smooth lugs 80-83, each one having a holding means such as an outward projecting or extending distal ridge or lip extending around the outer edge 90-93 forming a threaded means for holding and tightening. These lugs 80-83 cooperatively engage and extend downward through slots 70-75 in the upper body 20 and the teeth 90-93 cooperatively engage with the lower outer edge 69 of the corresponding slots 70-75 to hold the upper body 20 and the lower body 30 together.

The threaded lugs 21-26 include an upper ovoid shaped portion 230, 240, 250, 260, 270, 280 which are integrally formed as part of the upper main body 20 having an arcuate inner edge 209 including respective connecting arms 231, 241, 251, 261, 271, and 281 at a proximate end of the ovoid shaped members. The ovoid shaped portions are separated from the circular flat top surface 14 by U-shaped channels 170-175.

The connecting arm provides an elastic connection which allows the threaded lugs 21-26 to be urged radially inward or outward when the nut 10 is rotated. All of the lugs 21-26 are connected to the upper body 20. The flexing of the connecting arms and ovoid members enable the nut to be contracted and biased around a threaded member cooperatively engaging same.

Lower main body 30 includes an annular flat ring 36 with a cylindrical rim 12 extending downward from a central portion of flat ring 36 having an outer top surface 37 cooperatively engages and slideably rotates with respect to an outer bottom surface 38 of upper main body 20. A lubricant such as a light oil or grease or graphite material may optionally be used as a lubricant there between to facilitate the twisting motion of the lugs upon tighten the nut.

The inner wall 59 of rim 12 includes a selected number of spaced apart inwardly facing rim lugs 40-45 extending from the top surface 37 to the bottom surface 38 of the rim 12. Projecting inward from a bottom portion of the inner rim wall 59 a selected distance are a selected number of wedge shaped arcuate ramps 50-55 starting at a selected position from each rim lug 40-45 and increasing in thickness until intersecting with a first side wall 56 of the lugs 40-45. The ramps 50-55 are canted slightly so that, as the rim 12 is rotated clockwise, the lugs 21-26 extend radially inward expanding and decreasing the internal diameter of the nut 10 by pressing the threaded portions 6 of the lugs 21-26 firmly against the threads of the pipe 7. The ramps 50-55 end with abrupt flat steps 60-65 abutting the lugs 21-26 which provide a means of stopping or lock at the end of the ramp 50-55 to prevent further rotation between the upper main body 20 and lower main body 30 and hold the threaded lugs 21-26 in place. The wedge shaped arcuate ramps 50-55 terminate at the end abutting the second side wall 46 of the inward facing lugs 40-45 limiting rotation of the lower main body 30 with respect to upper main body 20 causing the threaded lugs 21-26 to firmly grasp the faucet pipe 7 for rotatably tightening to firmly hold the faucet in the counter top.

The annular flat ring 36 includes a plurality of arcuate slots 70-75 into which the downward extending lugs 80-83 are thrust and whereby the teeth 90-93 on the lower outer edge of the lugs 80-83 cooperate with the outer lower edge of the slots 70-75 to hold the upper main body 20 securely together with the lower main body 30. Extending downward from the annular flat ring 36 are at least two but preferably four wings 31-34 which are used to manually rotate the nut 10.

FIGS. 13-18 show the position of the lugs during positioning of the upper body with respect to the lower body from the rest (expanded state) to the threaded pipe engaging position wherein the lugs tighten during the contraction state.

FIG. 13(*a*) is a bottom view of the lock nut assembly showing the downward extending lugs around the outer periphery of the upper body extending through slots in the top surface of the flat ring extending around the rim of the lower body and the projecting threaded lugs of the upper body cooperatively engaging the ramps of the lower body wherein the threaded lugs rotate on the ramps and are rotated counterclockwise in a biased position against the side walls of the rim contracting the inner diameter of the lock nut prior during tightening. FIG. 13(*b*) shows the downward extending lugs around the outer periphery of the upper body extending through slots in the top surface of the flat ring extending around the rim of the lower body and the projecting threaded lugs of the upper body cooperatively engaging the ramps of the lower body wherein the threaded lugs rotate on the ramps and are rotated counterclockwise in a biased position against the side walls of the rim contracting the inner diameter of the lock nut and abutting the lug after tightening.

FIG. 14(*a*) is a top view of the lock nut assembly showing the downward extending lugs around the outer periphery of the upper body extending through slots in the top surface of the flat ring extending around the rim of the lower body and the projecting threaded lugs of the upper body cooperatively engaging the ramps of the lower body wherein the threaded lugs rotate on the ramps and are rotated counterclockwise in a resting position against the side walls of the rim expanding the inner diameter of the lock nut prior during tightening. FIG. 14(*b*) demonstrates how the downward extending lugs around the outer periphery of the upper body extending through slots in the top surface of the flat ring extending around the rim of the ower body and the projecting threaded lugs of the upper body cooperatively engaging the ramps of the lower body wherein the threaded lugs rotate on the ramps and are rotated counterclockwise in a biased position against the side walls of the rim contracting the inner diameter of the lock nut and abutting the lug after tightening.

Figure 15B:
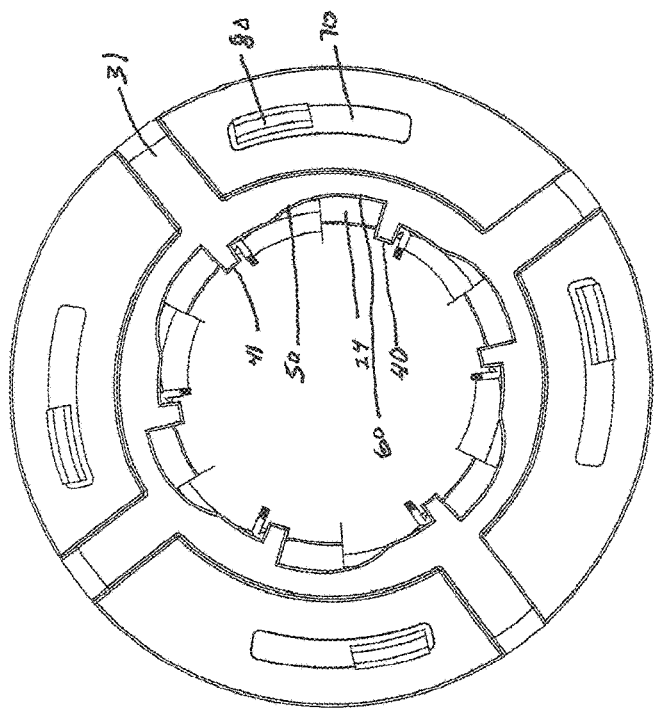
FIG. 15(b) is a bottom view of the lock nut assembly showing the downward extending lugs of the upper body around the outer periphery of the lower body in the closed contracted position.
Figure 15A:
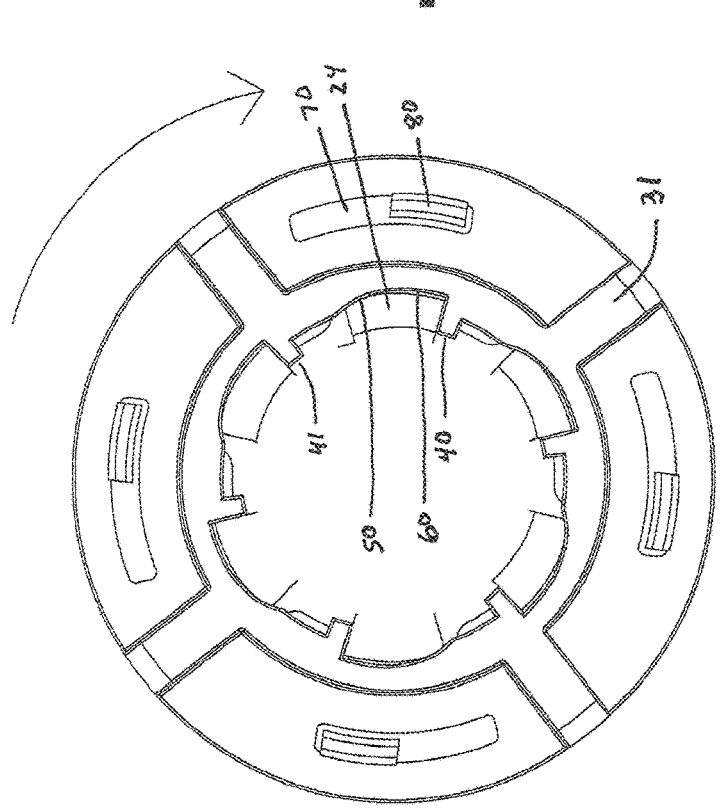
FIG. 15(a) is a bottom view of the lock nut assembly showing the downward extending lugs of the upper body around the outer periphery of the lower body in the open expanded position.

FIG. 15(*a*) is a bottom view of the lock nut assembly showing the downward extending lugs of the upper body around the outer periphery of the lower body extending through slots in the flat ring extending around the rim of the lower body and the projecting threaded lugs of the upper body cooperatively engaging the ramps of the lower body wherein the threaded lugs rotate on the ramps and are positioned in a resting position against the side walls of the rim expanding the internal diameter of the lock nut prior to tightening around a threaded pipe. FIG. 15(*b*) shows the downward extending lugs of the upper body around the outer periphery of the lower body extending through slots in the flat ring extending around the rim of the lower body and the projecting threaded lugs of the upper body cooperatively engaging the ramps of the lower body wherein the threaded lugs rotate on the ramps and are positioned in a position against the side walls of the rim contracting the internal diameter of the lock nut prior to tightening around a threaded pipe.

FIG. 16(*a*) is a top view of the lock nut assembly showing the downward extending lugs around the outer periphery of the upper body extending through slots in the top surface of the flat ring extending around the rim of the lower body and the projecting threaded lugs of the upper body cooperatively engaging the ramps of the lower body wherein the threaded lugs rotate on the ramps and are rotated counterclockwise in a retesting position against the side walls of the rim expanding the inner diameter of the lock nut prior during tightening around a threaded pipe. FIG. 16(*b*) shows the downward extending lugs around the outer periphery of the upper body extending through slots in the top surface of the flat ring extending around the rim of the ower body and the projecting threaded lugs of the upper body cooperatively engaging the ramps of the lower body wherein the threaded lugs rotate on the ramps and are rotated counterclockwise in a biased position against the side walls of the rim contracting the inner diameter of the lock nut and abutting the lug after tightening around a threaded pipe.

Figure 17B:
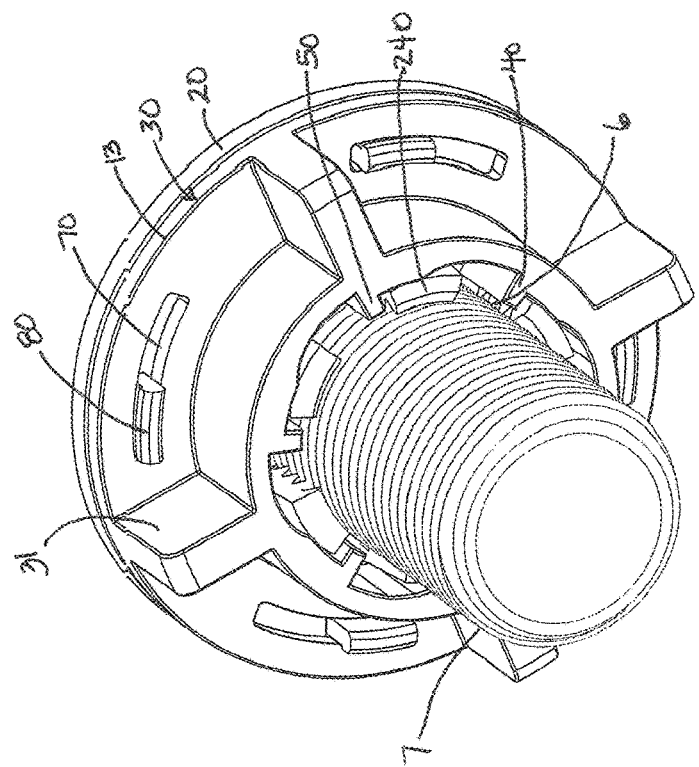
FIG. 17(b) is a perspective bottom view of the lock nut assembly showing the downward extending lugs around the outer periphery of the upper body in the contracted closed position.
Figure 17A:
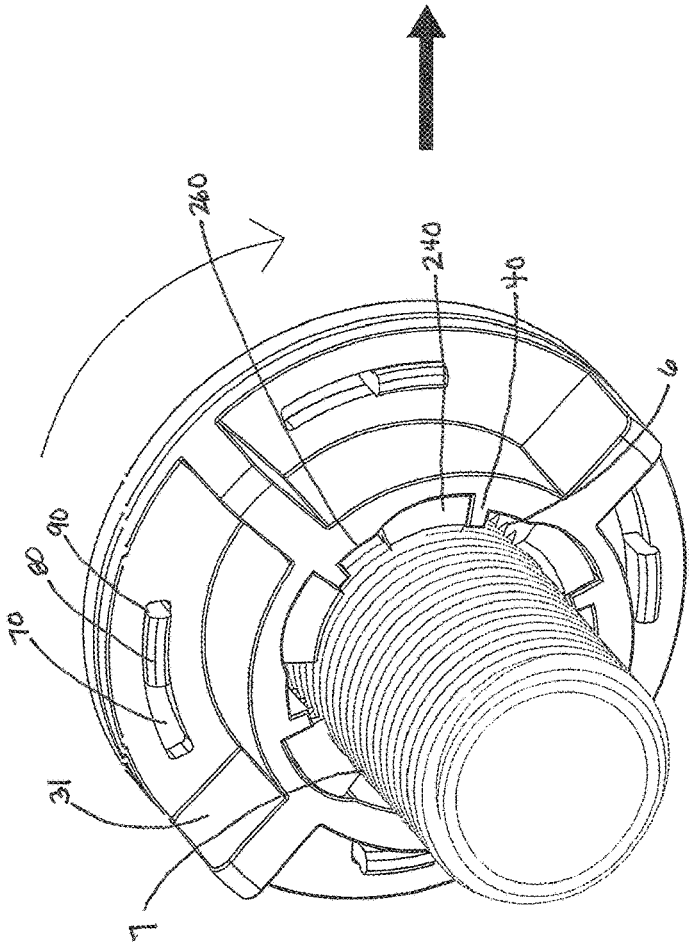
FIG. 17(a) is a perspective bottom view of the lock nut assembly showing the downward extending lugs around the outer periphery of the upper body extending through slots in the top surface of the flat ring in the expanded open position.

FIG. 17(*a*) is a perspective bottom view of the lock nut assembly showing the downward extending lugs around the outer periphery of the upper body extending through slots in the top surface of the flat ring extending around the rim of the lower body and the projecting threaded lugs of the upper body cooperatively engaging the ramps of the lower body wherein the threaded lugs rotate on the ramps and are rotated counterclockwise in a retesting position against the side walls of the rim expanding the inner diameter of the lock nut prior during tightening around a threaded pipe. FIG. 17(b) shows the downward extending lugs around the outer periphery of the upper body extending through slots in the top surface of the flat ring extending around the rim of the ower body and the projecting threaded lugs of the upper body cooperatively engaging the ramps of the lower body wherein the threaded lugs rotate on the ramps and are rotated counterclockwise in a biased position against the side walls of the rim contracting the inner diameter of the lock nut and abutting the lug after tightening around a threaded pipe.

Figure 18B:
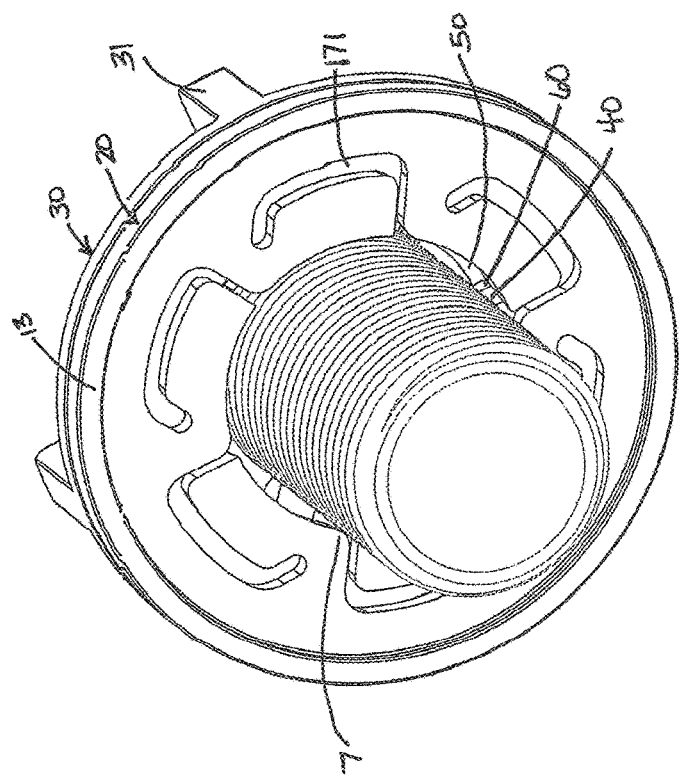
FIG. 18(b) is a perspective top view of the lock nut assembly showing the downward extending lugs around the outer periphery of the upper body extending through slots in the top surface of the flat ring in the contracted closed position.
Figure 18A:
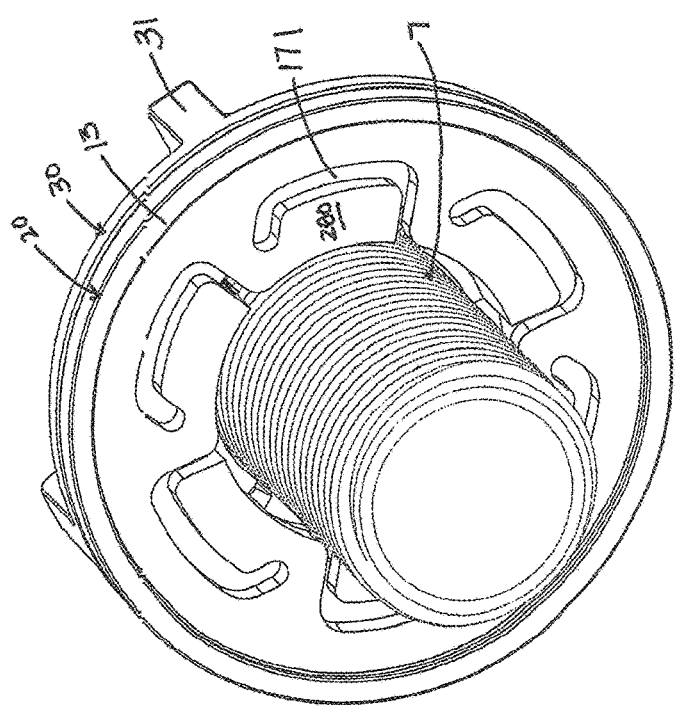
FIG. 18(a) is a perspective top view of the lock nut assembly showing the downward extending lugs around the outer periphery of the upper body extending through slots in the top surface of the flat ring in the expanded open position.
Figure 19:
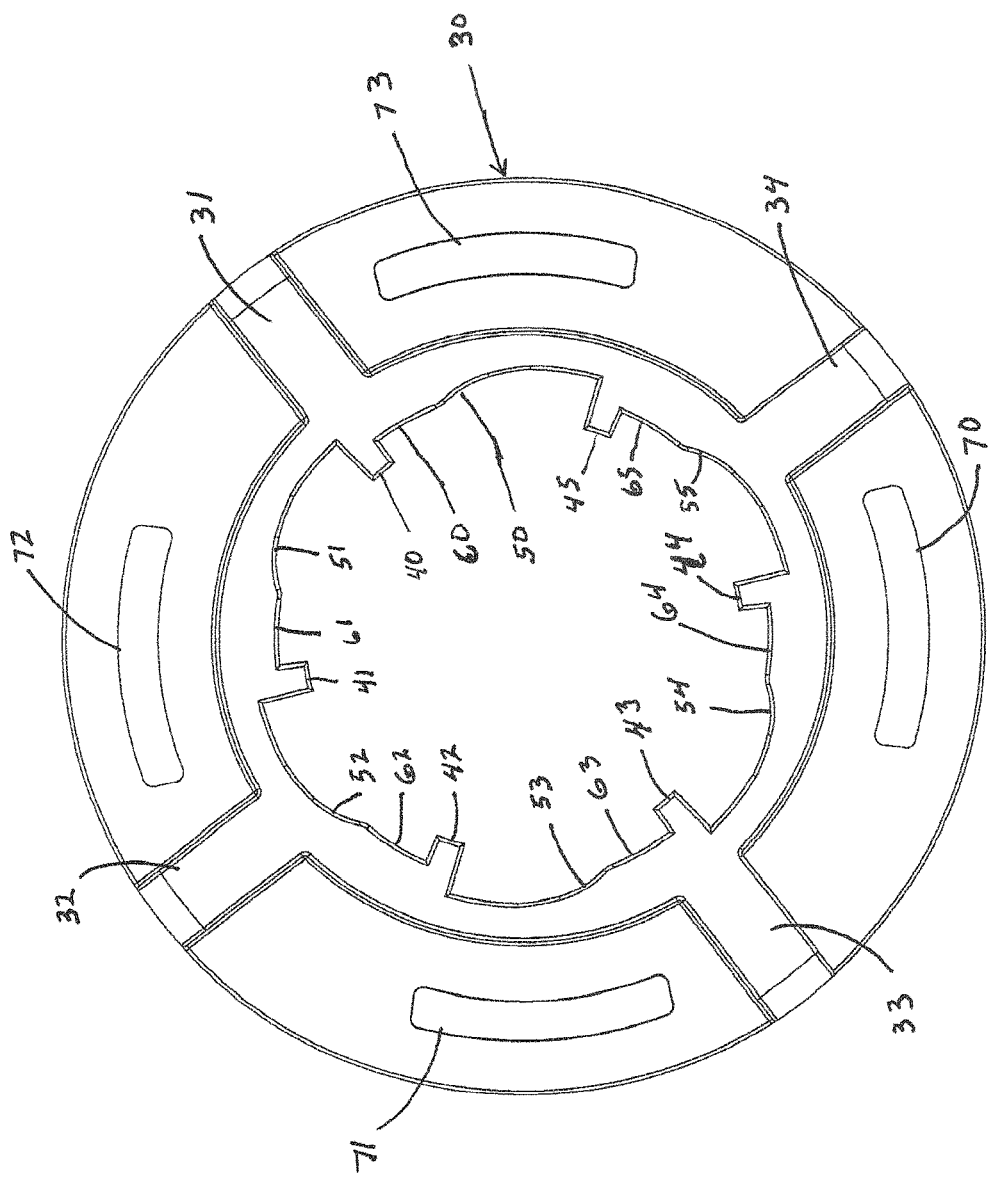
FIG. 19 is a bottom plan view of the lower body.
Figure 20:
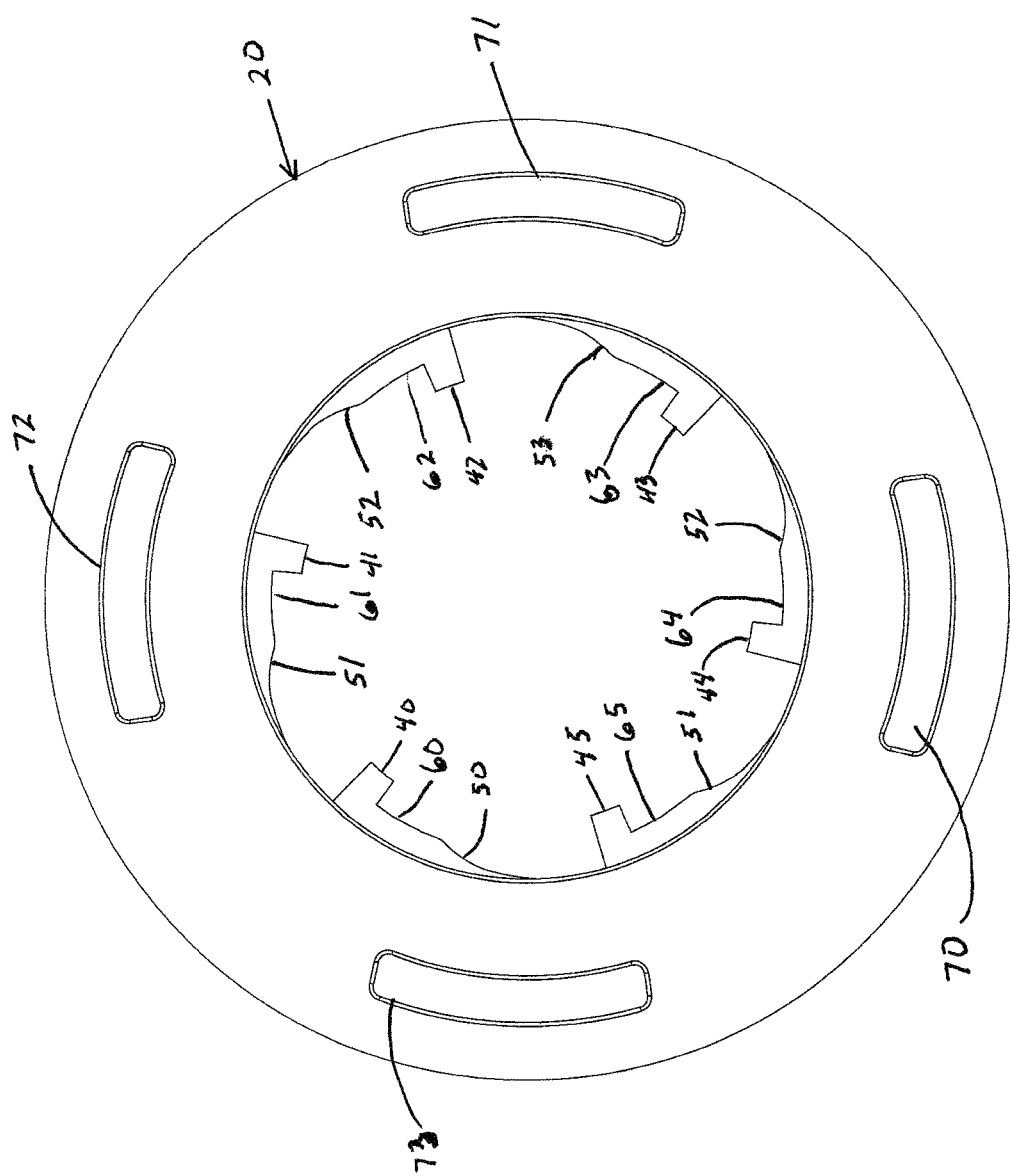
FIG. 20 is a top plan view of the lower body.
Figure 21:
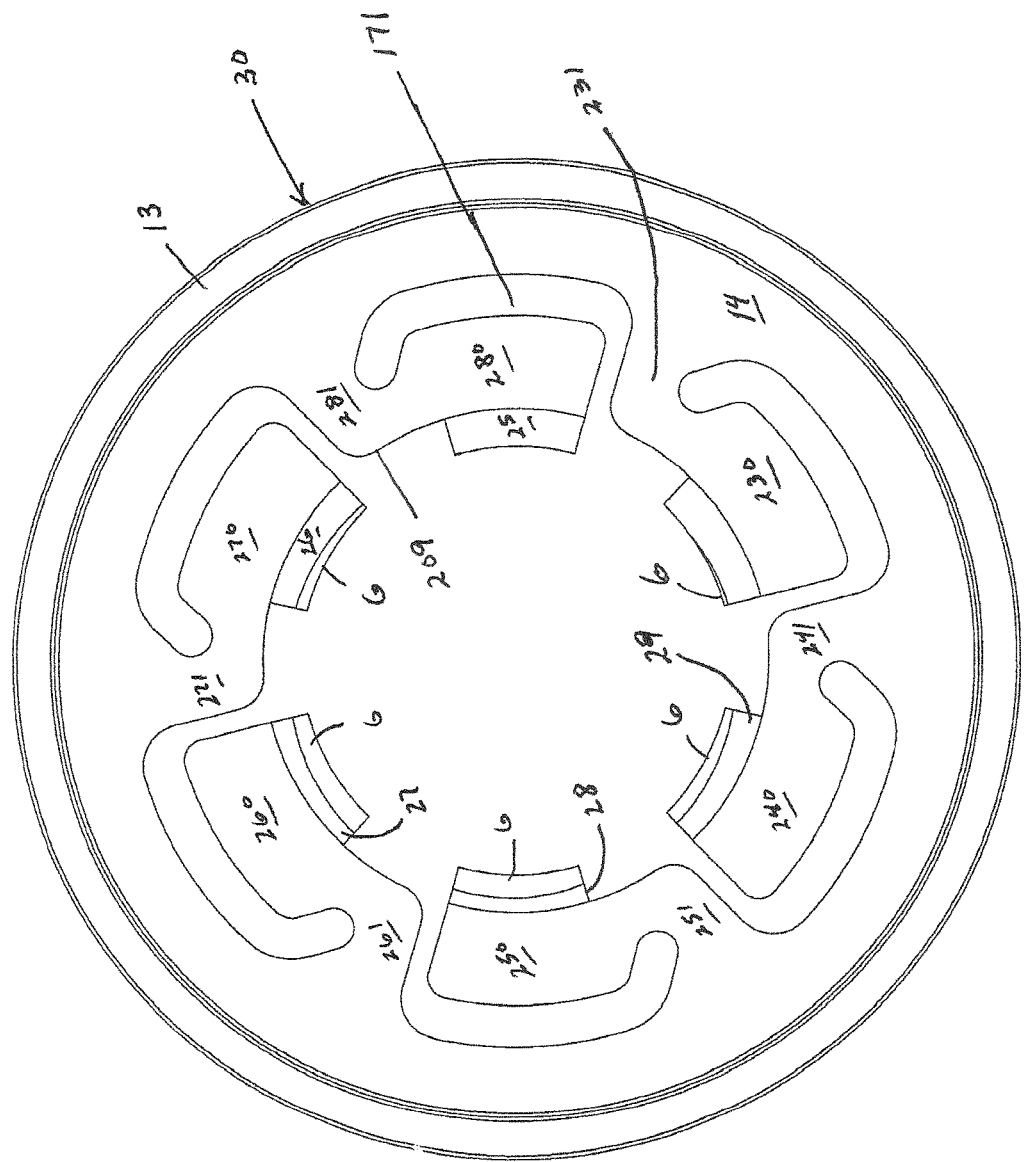
FIG. 21 is a bottom view of the lower body.
Figure 22:
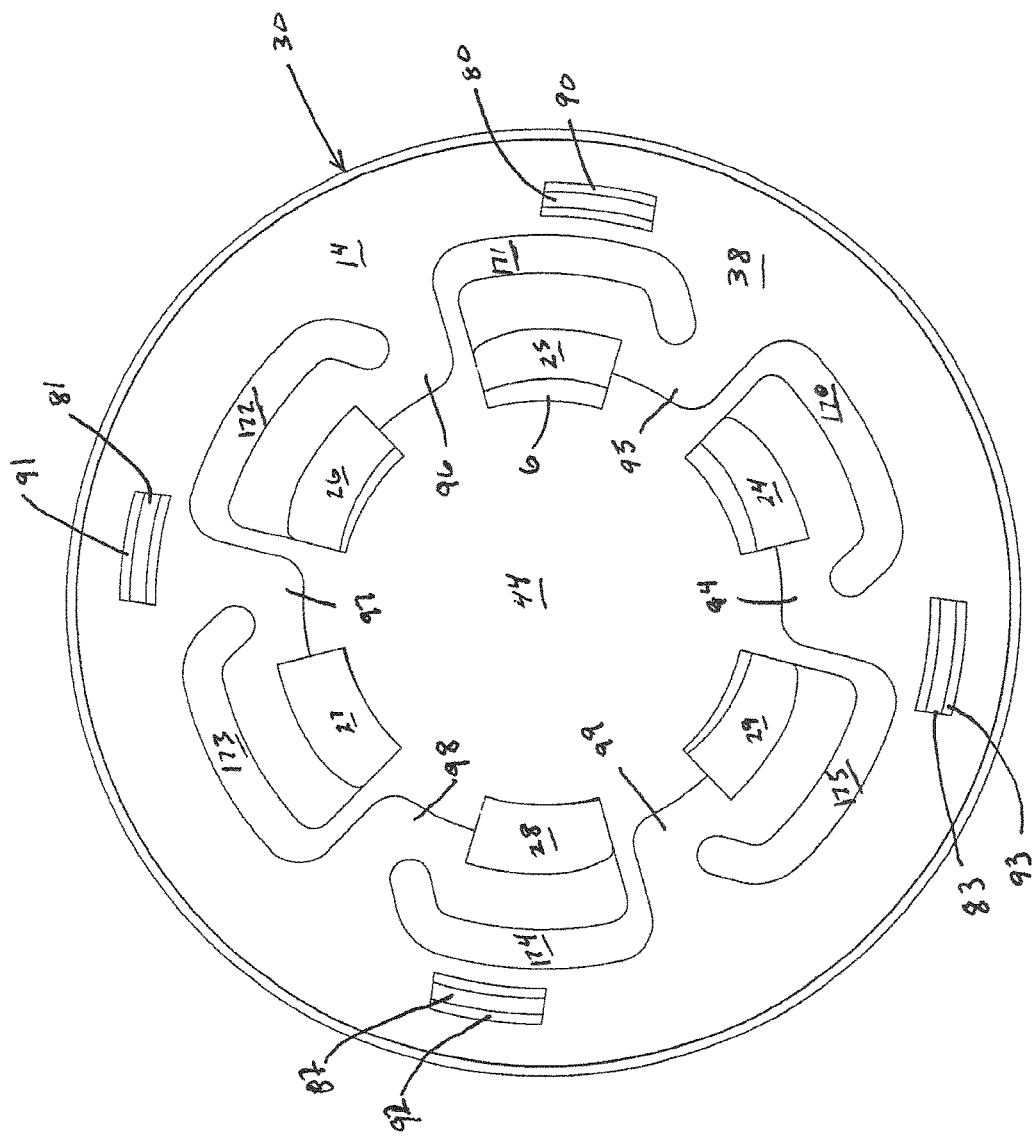
FIG. 22 is a top view of the lower body.

FIG. 18(a) is a perspective top view of the lock nut assembly showing the downward extending lugs around the outer periphery of the upper body extending through slots in the top surface of the flat ring extending around the rim of the lower body and the projecting threaded lugs of the upper body cooperatively engaging the ramps of the lower body wherein the threaded lugs rotate on the ramps and are rotated counterclockwise in a retesting position against the side walls of the rim expanding the inner diameter of the lock nut prior during tightening around a threaded pipe. In FIG. 18(b), the downward extending lugs extend around the outer periphery of the upper body and through slots in the top surface of the flat ring extending around the rim of the ower body and the projecting threaded lugs of the upper body cooperatively engaging the ramps of the lower body wherein the threaded lugs rotate on the ramps and are rotated counterclockwise in a biased position against the side walls of the rim contracting the inner diameter of the lock nut and abutting the lug after tightening around a threaded pipe.

The foregoing detailed description is given primarily for clearness of understanding and no unnecessary limitations are to be understood therefrom, for modification will become obvious to those skilled in the art upon reading this disclosure and may be made upon departing from the spirit of the invention and scope of the appended claims. Accordingly, this invention is not intended to be limited by the specific exemplification presented herein above. Rather, what is intended to be covered is within the spirit and scope of the appended claims.

We claim:

1. An adjustable lock nut, comprising:
an upper main body and a lower main body;
said upper main body having a circular top surface including an upward extending peripheral ring;
said upper main body includes six downward extending spaced apart threaded lugs with interior threaded portions facing radially inward for cooperatively engaging a threaded pipe
said upper main body including a plurality of downward extending spaced apart smooth lugs, each smooth lug having an outward extending distal ridge extending around an outer edge;
said spaced apart threaded lugs extending from a plurality of corresponding ovoid shaped base members which integrally connect to said upper main body by a connecting portion at one end of said ovoid shaped member biasing said threaded lugs inwardly for cooperatively engaging said threaded pipe;
said lower main body including an annular flat ring with a cylindrical rim extending downward from a central portion of said flat ring;
said cylindrical rim having spaced apart inward facing arcuate shaped ramps each one formed from a wedge shaped step, each arcuate shaped ramp being canted and terminating at a distal end by an inward facing lug;
said annular flat ring having a plurality of spaced apart arcuate slots formed therein;
each spaced apart smooth lug reaching downward through said arcuate slot whereby said outward extending distal ridge at said outer edge of said spaced apart smooth lug cooperatively engages an outer lower edge of said arcuate slot to hold said upper main body securely together with said lower main body; and
said annular flat ring including means for manually rotating said adjustable lock nut.

2. The adjustable lock nut assembly of claim 1, wherein means for manually rotating said adjustable lock nut comprises a wing extending downward from said annular flat ring.

3. An adjustable lock nut, comprising:
an upper main body and a lower main body;
said upper main body having a circular top surface including an upward extending peripheral ring;
said upper main body includes a plurality of downward extending spaced apart threaded lugs with interior threaded portions facing radially inward for cooperatively engaging a threaded pipe said upper main body including a plurality of downward extending spaced apart smooth lugs, each smooth lug having an outward extending distal ridge extending around an outer edge;
said spaced apart threaded lugs extending from a plurality of corresponding ovoid shaped base members which integrally connect to said upper main body by a connecting portion at one end of said ovoid shaped member rotatably biasing said threaded lugs inwardly for cooperatively engaging said threaded pipe;
said lower main body comprising an annular flat ring having an open center with a cylindrical rim extending downward from a central portion of said annular flat ring;
said cylindrical rim having spaced apart inward facing arcuate shaped ramps each one formed from a wedge shaped step, each arcuate shaped ramp being canted terminating at a distal end by an inward facing lug;
said annular flat ring having a plurality of spaced apart arcuate slots formed therein;
each spaced apart smooth lug reaching downward through said arcuate slot whereby said outward extending distal ridge at said outer edge of said spaced apart smooth lug cooperatively engages an outer lower edge of said arcuate slot to hold said upper main body securely together with said lower main body; and
said annular flat ring including means for manually rotating said adjustable lock nut rotatably biasing and tightening said flat lugs against a threaded pipe.

4. The adjustable lock nut of claim 3, wherein means for manually rotating said adjustable lock nut comprises a plurality of wings extending outward from said cylindrical rim and downward from said annular flat ring.

5. An adjustable lock nut, comprising:
an upper main body and a lower main body;
said upper main body having a circular top surface including an upward extending peripheral ring;
said upper main body includes a plurality of downward extending spaced apart gripping lugs with interior portions facing radially inward for cooperatively engaging a pipe said upper main body including a plurality of downward extending spaced apart smooth lugs, each smooth lug having an outward extending distal ridge extending around an outer edge;

said spaced apart gripping lugs extending from a plurality of corresponding ovoid shaped base members which integrally connect to said upper main body by a connecting portion at one end of said ovoid shaped member rotatably biasing said gripping lugs inwardly for cooperatively engaging said pipe;

said lower main body comprising an annular flat ring having an open center with a cylindrical rim extending downward from a central portion of said flat ring;

said cylindrical rim having spaced apart inward facing arcuate shaped ramps each one formed from a wedge shaped step, each arcuate shaped ramp being canted terminating at a distal end by an inward facing lug;

said annular flat ring having a plurality of spaced apart arcuate slots formed therein;

each spaced apart smooth lug reaching downward through said arcuate slot whereby said outward extending distal ridge at said outer edge of said spaced apart smooth lug cooperatively engages an outer lower edge of said arcuate slot to hold said upper main body securely together with said lower main body; and said annular flat ring including means for manually rotating said adjustable lock nut rotatably biasing and tightening said flat lugs against a pipe.

6. The adjustable lock nut of claim 5, wherein means for manually rotating said adjustable lock nut comprises a wing extending outward from said cylindrical rim and downward from said annular flat ring.

\* \* \* \* \*